United States Patent Office 3,737,540
Patented June 5, 1973

---

3,737,540
COMPOSITION FOR SUPPRESSING THE TREMOR OF PARKINSON'S SYNDROME
Rodolfo Rodriguez, Mexico City, Mexico, assignor to Miles Laboratories, Inc., Elkhart, Ind.
No Drawing. Filed Feb. 14, 1972, Ser. No. 226,237
Int. Cl. A61k 27/00
U.S. Cl. 424—250        6 Claims

ABSTRACT OF THE DISCLOSURE

The tremor of Parkinson's syndrome in mammals is suppressed by the administration of a composition comprising (1) a compound of the formula

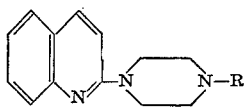

in which R is either H or $CH_3$, and nontoxic pharmacologically acceptable acid addition salts thereof, and (2) L-3,4-dihydroxyphenylalanine.

---

This invention relates to a novel composition and process for supressing Parkinson-like syndrome in a mammal by the administration to such mammal of a tremor suppressing quantity of a composition comprising (1) a compound of the formula

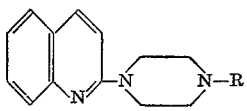

in which R is H or $CH_3$, and nontoxic pharmacologically acceptable acid addition salts thereof, and (2) L-3,4-dihydroxyphenylalanine, the ratio in said composition of compound (1) to compound (2) being about from 1:320 to 1:20, and preferably 1:80.

The management of Parkinson's disease is a complex problem in which drug therapy plays a major role. For many years the most widely used therapeutic agents were belladonna alkaloids such as atropine and scopolamine, and although some neurologists still regard these products as useful agents, they have been largely replaced by synthetic anticholinergic compounds such as trihexyphenidyl, benztropine, cycrimine, procyclidine and biperiden. Certain drugs that are classified primarily as antihistaminics such as diphenhydramine, orphenadrine and chlorphenoxamine are also used in Parkinson's disease, but since these also exhibit significant anticholinergic actions, it is probable that the underlying attribute responsible for their therapeutic activity is related to this effect.

Recently, the dopamine precursor, L-3,4-dihydroxyphenylalanine, more commonly referred to as levodopa, has been shown to be effective in controlling Parkinsonism when administered in adequate doses over extended periods of time. Although levodopa is beneficial in alleviating the primary symptoms of Parkinsonism, its clinical use is limited by the frequency with which it elicits untoward side effects at the effective dosage level. Thus, nausea, anorexia, vomiting, attempted suicide, agitation, confusion, restlessness, hallucinations, delirium, choreifor movements, palpitations, postural hypotension flushing and phlebitis may occur with the administration of levodopa at the therapeutically effective dosage level.

It has now unexpectedly been found that antiparkinson activity of levodopa in mammals is substantially increased or potentiated by inclusion therewith of a small amount of 1-(2-quinolyl)piperazine or 1-(2-quinolyl)-4-methylpiperazine. The ratio of the potentiating compound to levodopa will be disclosed hereinafter.

Levodopa has recently been shown to be the drug of choice in treating Parkinson's disease. This compound, which has the formula

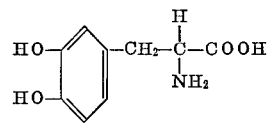

has been known for some time and may be prepared or synthesized by several methods. One method reported by Barry et al. in The Journal of the American Chemical Society, vol. 70, pages 693–694 (1948) involves the nitrosation of 3,4 - methylenedioxybenzylacetoacetic ester and 3,4 - methylenedioxybenzylomalonic acid to $\alpha$ - oximino $\beta$ - (3,4 - methylenedioxyphenyl)-propionic, which is catalytically reduced to 3,4 - methylenedioxyphenyl-alanine. This compound can then be hydrolyzed to dl-dopa with hydridodic acid.

The compound of the present invention which potentiates the activity of levodopa has the following structural formula:

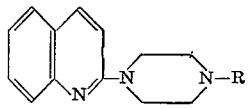

in which R is H or $CH_3$ and nontoxic pharmacologically acceptable acid addition salts thereof. A free base formed with these compounds may be conveniently prepared by reacting a 2-haloquinoline with piperazine or methylpiperazine in the presence of a suitable solvent. The acid addition salts are then readily prepared from the free base using known chemical procedures. These reactions may be illustrated by means of the following equations in which the 2-haloquinoline is 2-bromoquinoline and the acid used for salt formation is maleic acid resulting in the formation of 1-(2-quinolyl)piperazine maleate, as follows:

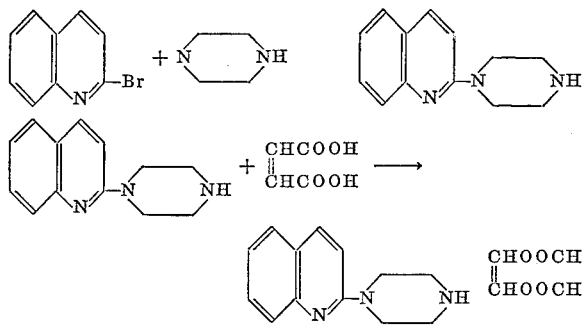

Although 2 - bromoquinoline has been utilized in this general equation, other 2-haloquinolines, such as 2 - chloroquinoline, may be similarly used with equally desirable results.

As indicated hereinabove, it has been found that when a small quantity of a compound of Formula 1 is admixed with a therapeutically ineffective quantity of levodopa, the tremor suppressing or antiparkinson activity of levodopa is potentiated and the lower dosage form becomes effective. In regard to such a composition, the ratio on a weight to weight basis of compound 1 to levodopa is advantageously set at from 1:320 to 1:20 and preferably 1:80. Therapeutic dosages will be shown in the examples which follow; however, the usual dose of the novel combination is set to a range of about from 5 mg./kg./day to 20 mg./kg./day.

Dosage forms may be conveniently prepared by combining the active ingredients of the present invention with a pharmaceutical vehicle having components selected from the fillers, carriers, extenders, excipients and the like, generally used in pharmaceutical formulations. Medications may be prepared in the solid state as tablets or capsules or in the liquid state as suspensions or solutions. Similar dosage forms suitable for oral, parenteral, intramuscular, subcutaneous, intravenous or other convenient routes of administration may also be provided. The pharmaceutical vehicle may also include common diluents or tableting adjuncts such as cellulose powder, cornstarch, magnesium stearate, calcium sulfate, talc and such, used according to accepted pharmaceutical manufacturing practices. As noted above, in unit dosages (a specific weight, such as mg. or g.) of active ingredient in a medication may be varied so that an adequate amount is present to provide the desired therapeutic dose which produces a particular therapeutic effect without untoward side effects. Unit dosages of between 50 and 300 mg. per tablet, capsule and so forth, are beneficially used for oral administration of the medication.

The invention will be further understood by reference to the following examples which are provided as illustrations and are not intended to be construed as limitations upon the invention which is properly set forth in claims appended hereto.

EXAMPLE I

Preparation of 1-(2-quinolyl)piperazine

A mixture of 2-chloroquinoline (477 g., 2.92 moles), piperazine (503 g., 5.83 moles) and 750 ml. of toluene was stirred and heated under reflux for 6 hours. The mixture was cooled in an ice bath and 750 ml. of water was added with stirring. Then the mixture was acidified with concentrated hydrochloric acid. The insoluble 1,4-bis-(2-quinolyl)piperazine was removed by filtering the slightly warm mixture through infusorial earth. The filtrate was diluted with 2 liters of water which dissolved most of the solid which had separated out. The toluene layer was separated and the aqueous portion was extracted with a little ether. Then the aqueous mixture was treated with decolorizing charcoal and filtered through infusorial earth. The solution was made alkaline with sodium hydroxide. The solid free base was collected on a filter and washed with water. The crude material was dissolved in about 1 liter of hot ethanol and the solution was clarified with charcoal. Then the mixture was diluted with 2 liters of water. The white crystals which separated on cooling were collected, washed with water and dried in an oven at 150° F. The 1-(2-quinolyl)-piperazine (437 g., 70.2 percent) melted at 81°–83° C.

Analysis.—Calcd. for $C_{13}H_{15}N_3$ (percent): N (basic), 13.14; N (total), 19.70. Found (percent): N (basic), 12.93, N (total), 19.72.

EXAMPLE 2

Preparation of 1-(2-quinolyl)piperazine maleate

The free base was dissolved in 4200 ml. of hot 2-propanol and a solution of maleic acid (239 g., 2.06 moles) in 1500 ml. of hot 2-propanol was added in one portion with stirring. The stirring was continued, while the mixture was cooled in an ice bath. Then the salt was collected, washed with 2-propanol and dried in the oven at 150° F. The 1-(2-quinolyl)piperazine maleate amounted to 650 g. (95.8 percent based on the free base) and melted at 174°–175° C.

Analysis.—Calcd. for $C_{17}H_{19}N_3O_4$ (percent): N (basic), 8.51; N (total), 12.75; N.E., 164.7. Found (percent): N (basic), 8.50; N (total), 12.70; N.E., 165.3.

EXAMPLE 3

Preparation of 1-(2-quinolyl)-4-methylpiperazine

A mixture of 2-chloroquinoline (81.8 g., 0.5 mole), 1-methylpiperazine (100.2 g., 1 mole) and 100 ml. of toluene was heated to boiling. An exothermic reaction set in, but it was necessary to apply additional heat to maintain a vigorous boiling. After about 30 minutes the spontaneous reaction was over, and the mixture was heated under reflux for 2 hours longer. A dark syrupy material separated out.

The mixture was stirred and cooled, during which 300 ml. of water containing 100 ml. of concentrated hydrochloric acid was added. A small amount of insoluble solid material was removed by filtration and washed with ether and water. The aqueous portion of the filtrate and washings was separated and clarified with charcoal. An excess of a saturated aqueous solution of sodium hydroxide was added to the filtrate. The free base was collected, washed with water and dried at 50° C. The crude product (104.5 g., 95%) melted at 110°–111° C.

The crude free base was dissolved in hot ethanol, and the solution was clarified with charcoal. The filtrate and washings were concentrated by evaporation and diluted with hot water to incipient cloudiness. The crystals which formed on cooling and scratching were collected, washed with water and dried at 100° C. The cream-colored free base (102 g., 90%) melted at 111°–112° C.

Analysis.—Calcd. for $C_{14}H_{17}N_3$ (percent): N (basic), 6.16. Found (percent): N (basic), 6.08.

EXAMPLE 4

Preparation of 1-(2-quinolyl)-4-methylpiperazine maleate 1-(2 - quinolyl) - 4 - methylpiperazine (101.0 g., 0.445 mole) in 300 ml. of hot 2-propanol was treated with a solution of maleic acid (53.6 g., 0.46 mole) in 200 ml. of hot 2-propanol. Crystals began to form immediately. After cooling in an ice bath the crystals were collected, washed with ethyl acetate and dried at 100° C. The crude salt (146.0 g., M.P. 160°–161° C.) was dissolved in about 2 liters of boiling 2-propanol. The solution was concentrated by evaporation until crystals began to form. The mixture was cooled and the salt was collected. The crystals were washed with ethyl acetate and dried at 100° C. The product amounted to 141.5 g. (93%).

Analysis.—Calcd. for ($C_{14}H_{17}N_3 \cdot C_4H_4O_4$ (percent): N (basic), 8.16; N (total), 12.24; N.E., 171.7. Found (percent): N (basic), 8.14; N (total), 12.32; N.E. 173.3.

EXAMPLE 5

Pharmacological activity of combination of 1-(2-quinolyl)-piperazine (Compound A) or 1-2-(2-quinolyl)-5-methylpiperazine (Compound B) and levodopa The anti-Parkinson activity of the novel compositions of the present invention was assessed by its ability to antagonize tremorine-induced tremor in mice and was compared to levodopa alone. In a first series of experiments groups of 10 mice were given a fixed, relatively ineffective amount of Compound A (1.25 mg./kg.) or Compound B (2.5 mg./kg.) together with doses of levodopa ranging from 25 to 400 mg./kg. In a second group of experiments animals received a fixed, relatively ineffective amount of levodopa (100 mg./kg.) together with doses of Compound A ranging from 0.312 to 5.0 mg./kg. or doses of Compound B ranging from 0.625 to 10.0 mg./kg. In all experiments compositions of the present invention and levodopa were administered orally fifteen minutes before the intraperitoneal injection of tremorine (20 mg./kg.). This dose of tremorine causes severe tremor, together with profuse salivation, lachrymation and diarrhea. The presence of tremor was determined 30 minutes after the administration of tremorine by an observer who was unaware of the treatment the animals had received. Animals which did not show tremor of the head during a oneminute observation period were considered protected. The results observed are presented in Tables I and II.

TABLE I

| Drug | ED₅₀ (mg./kg., p.o.) | CL₉₅ |
|---|---|---|
| Levodopa | 370.0 | 269.0–509.0 |
| Compound A | 5.0 | 3.3–7.5 |
| Compound B | 15.5 | 9.4–25.6 |
| Levodopa plus Compound A (1.25 mg./kg.) | 60.0 | 30.0–120.0 |
| Levodopa plus Compound B (2.5 mg./kg.) | 300.0 | (¹) |

¹ Not obtainable.

TABLE II

Dose (mg./kg., p.o.)

| Compound A | Compound B | Levodopa | Ratio | Percent protected |
|---|---|---|---|---|
| | | 100.0 | | 10 |
| 0.312 | | 100.0 | 1:320 | 20 |
| 1.25 | | 100.0 | 1:80 | 70 |
| 2.5 | | 100.0 | 1:40 | 40 |
| | 0.625 | 100.0 | 1:160 | 10 |
| | 1.25 | 100.0 | 1:80 | 30 |
| | 2.5 | 100.0 | 1:40 | 40 |
| | 5.0 | 100.0 | 1:20 | 40 |

What is claimed is:

1. A composition for suppressing the tremor of Parkinson's syndrome in mammals comprising:
   (1) a compound

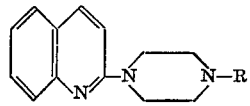

selected from the group consisting of 1-(2-quinolyl)-piperazine, 1-(2-quinolyl)-4-methyl piperazine, and a nontoxic, pharmacologically acceptable acid addition salt of either, and
   (2) L-3,4-dihydroxyphenylalanine, wherein (1) is present in a weight to weight ratio to (2) of about from 1:320 to 1:20.

2. A composition as in claim 1 wherein the ratio is 1:80.

3. A composition as in claim 1 wherein the compound is 1-(2-quinolyl)-piperazine.

4. A composition as in claim 1 wherein the compound is 1-(2-quinolyl)-4-methylpiperazine.

5. A composition as in claim 1 wherein the compound is 1-(2-quinolyl)piperazine maleate.

6. A composition as in claim 1 wherein the compound is 1-(2-quinolyl)-4-methylpiperazine maleate.

References Cited

UNITED STATES PATENTS

| 3,362,956 | 1/1968 | Archer | 260—268 H |
| 3,576,809 | 4/1971 | Stauffer | 260—268 BQ |

STANLEY J. FRIEDMAN, Primary Examiner

U.S. Cl. X.R.

424—319; 260—268 BQ, 268 HET